United States Patent [19]

Panzera

[11] 4,080,204

[45] Mar. 21, 1978

[54] FENICRALY ALLOY AND ABRADABLE SEALS MADE THEREFROM

[75] Inventor: Carlino Panzera, Belle Mead, N.J.

[73] Assignee: Brunswick Corporation, Skokie, Ill.

[21] Appl. No.: 671,398

[22] Filed: Mar. 29, 1976

[51] Int. Cl.² ............................................. B22F 1/00
[52] U.S. Cl. ....................................... 75/229; 75/235; 75/246; 75/12 BE; 415/174; 428/605
[58] Field of Search ............... 29/182.5, 182; 415/174; 75/128 E, 229, 235, 246; 428/605

[56] References Cited

U.S. PATENT DOCUMENTS

| 2,930,521 | 3/1960 | Koehring | 415/174 |
|---|---|---|---|
| 3,042,365 | 7/1962 | Curtis | 415/174 |
| 3,817,719 | 6/1974 | Schilke et al. | 29/182.5 |
| 3,912,552 | 10/1975 | Schultz et al. | 29/182.5 |

*Primary Examiner*—Brooks H. Hunt
*Attorney, Agent, or Firm*—J. G. Heimovics; D. S. Guttman; S. L. Epstein

[57] ABSTRACT

Abradable seals for compressors and turbines are made of fibers and powders of an alloy consisting essentially of iron, nickel, chromium, aluminum, and yttrium. The alloy preferably contains 22–27 weight percent nickel, 18–22 weight percent chromium, 9–15 weight percent aluminum, 0.0005–0.05 weight percent yttrium, with the balance iron. Heat treatment of the alloy provides an aluminum rich phase which is uniformly dispersed throughout the alloy.

12 Claims, 9 Drawing Figures

FIG. 5
FIG. 6
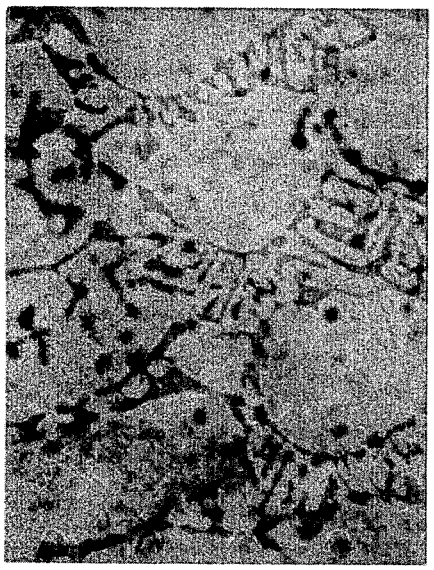

FENICRALY ALLOY AND ABRADABLE SEALS MADE THEREFROM

BACKGROUND

Abradable seals are used in compressors and turbines to provide a seal between rotating and stationary members. These seals are made of metal fibers and powders that are able to withstand high temperatures and the oxidizing and sulfidizing environment in the compressor or turbine. The present seals can only be used in sections of the compressors and turbines where the temperature does not exceed 1200° F. It is the objective of my invention to provide alloys for seals that can withstand temperatures as high as 1900° F.

THE INVENTION

I have discovered a new alloy comprising iron, nickel, chromium, aluminum, and a metal selected from Group IIIB of the Periodic Table. The preferred Group IIIB metal is yttrium. I have identified the preferred alloy by the acronym FeNiCrAlY. This FeNiCrAlY alloy resists high temperature oxidation and sulfidation and is used in seals that can be exposed to temperatures as high as 1900° F.

The FeNiCrAlY alloy may include other ingredients. For example, in applications other than abradable seals such as blades, vanes, and other jet engine hardware requiring high temperature strength, it may be desirable to add to the alloy such materials as cobalt, magnesium, silicon, carbon, tantalum, or tungsten. Moreover, since it is difficult to separate yttrium from the rare earth metals, some rare earth elements will normally be present in trace amounts in the FeNiCrAlY alloy.

The proportions of metals in the alloy are critical. The aluminum concentration is from 2 to 15 weight percent. The nickel concentration is from 15 to 35 weight percent. At least 12 weight percent chromium must be present. The Group IIIB metal concentration is from 0.0005 to 0.5 weight percent. Iron comprises the balance and is present in an amount greater than any other metal. The combined concentration of aluminum and chromium does not exceed 35 weight percent and the combined concentration of nickel and chromium does not exceed 50 weight percent. The most preferred alloy consist essentially of 22-27 weight percent nickel, 18-22 weight percent chromium, 9-15 weight percent aluminum, and 0.0005 to 0.05 yttrium, with the balance iron (Type A alloy).

Type A alloy is most preferably used in manufacturing abradable seals. An ingot of the Type A alloy, as initially cast, is very hard and difficult to machine. However, upon heat treating at temperatures ranging between 2100° and 2200° F, the alloy's hardness is reduced. This greatly improves its machinability. Heat treatment of the alloy results in precipitation of an aluminum rich phase which is uniformly dispersed throughout the alloy. This aluminum rich phase comprises nickel aluminide and iron aluminide containing some dissolved chromium and yttrium. It is dispersed throughout the alloy as microscopic particles which typically have a diameter ranging between about 1 and about 4 micrometers.

Fiber made from the Type A alloy has excellent high temperature oxidation and sulfidation resistance. Such fiber has an aspect ratio (length/diameter) greater than 10. Preferably the fiber's aspect ratio ranges between 20-75. The length of the fiber is greater than 40 microns, for example, 200-400 microns. The diameter of the fiber is less than 200 microns, for example, 10-35 microns.

Aluminum serves to impart oxidation resistance to the fiber. Aluminum has this property because aluminum in preference over other metals in the alloy combines with oxygen to form an aluminum oxide coating on the fiber's surface. The rate of aluminum oxidation is relatively slow. Hence, the alloy only slowly oxidizes. If less than 4 weight percent aluminum is used, the alloy has poor oxidation resistance. If more than 15 weight percent aluminum is used, the alloy becomes too hard.

Fiber diameter affects oxidation and sulfidation resistance. Small diameter fibers tend to oxidize more rapidly than large diameter fibers. This is compensated for by adding more aluminum to small diameter fibers. Normally the fiber contains a minimum of 6 weight percent aluminum. Under oxidizing conditions, uncombined aluminum is continuously delivered from the fiber's interior to the fiber's surface to form the aluminum oxide coating. When the level of unoxidized aluminum in the fiber approaches 3 weight percent, chromium and iron oxides begin to form and the fiber rapidly losses its oxidation resistance and breaks apart.

Chromium serves to impart sulfidation resistance to the alloy. It is well known that the chromium reacts with sulfur and prevents the sulfur from reacting with the aluminum. The aluminum is then free to react with the oxide to form protective aluminum oxide.

I believe the nickel imparts to the FeNiCrAlY alloy the ability to withstand temperatures in excess of 1500° F. I have tested a 5 mil thick $\phi$ oil of FeNiCrAlY alloy at temperatures as high as 1900° F for 1600 hours in air and observed only slight oxidation.

The purpose of the yttrium or other Group IIIB metal in the alloy is to bond the aluminum oxide coating to the alloy's surface. When the yttrium level exceeds about 0.05 weight percent, an iron-yttrium phase (YFe9) precipitates. At levels below about 0.05 weight percent this iron-yttrium phase does not form. The iron-yttrium phase is subject to rapid oxidation notwithstanding the presence of aluminum. Consequently, it is desirable to avoid formation of the iron-yttrium phase. This is especially true in the manufacture of high surface area elements such as fibers, powders, foil, and wire. A high surface area element is any element having a surface to volume ratio greater than 50 cm$^{-1}$. In fibers made from Type A alloy, the amount of yttrium used is insufficient to form the iron-yttrium phase but is adequate to insure adhesion of the aluminum oxide coating to the element's surface. Typically from 0.0005 to 0.05 weight percent yttrium is used.

A seal made from fibers or powders of the above alloys is essentially a porous mass formed of fibers or powder particles sintered together. Normally such seals have a fractional density ranging between .1 and .5. Fractional density (D) is calculated by dividing the total volume ($V_t$) of the seal minus the void volume ($V_o$) in the seal by the total volume of the seal.

$$D = (V_t - V_o)/V_t$$

Seals made principally of fibers are preferred.

THE DRAWINGS

FIG. 5 is a photomicrograph taken at 500 magnification of an untreated cobalt base alloy.

FIG. 6 is a photomicrograph taken at 500 magnification of the alloy of FIG. 5 after heat treatment.

PREPARATION OF ALLOY

Example

Iron, nickel, chromium, aluminum, and yttrium powders are mixed together in the following percentages:

|    | (wt %) |
|----|--------|
| Fe | 46.99  |
| Ni | 25.00  |
| Cr | 19.00  |
| Al | 9.00   |
| Y  | 0.01   |

The blend of powder is then melted in an induction heated vacuum furnace. The melt is poured into a crucible to form an ingot which is allowed to cool. The melting point of this FeNiCrAlY alloy is about 2575° F.

Figure 1:
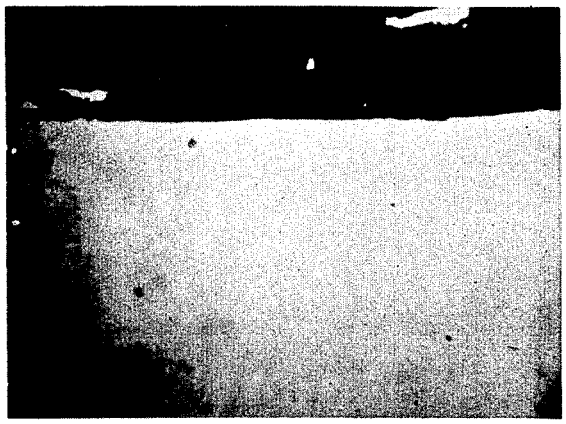
FIG. 1 is a photomicrograph of the untreated FeNiCrAlY alloy taken at 500 magnification.
Figure 2:
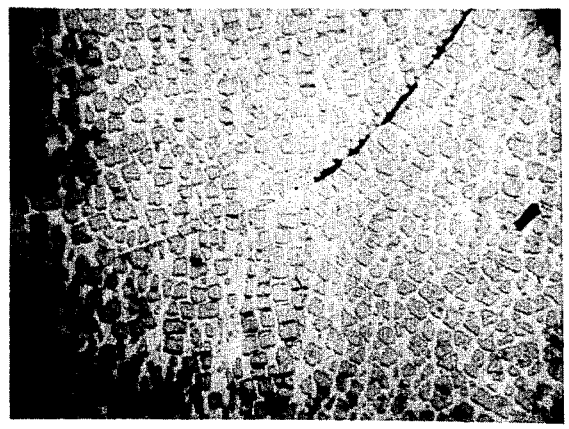
FIG. 2 is a photomicrograph of the heat treated Fi-NiCrAlY alloy taken at 1,000 magnification.

The untreated alloy of the example includes only a single phase. This is illustrated in FIG. 1. On heat treating the ingot of the example for 8 hours at a temperature of 2175° F, a phase separation occurs. This is shown in FIG. 2. The dark grey particles are the aluminum rich phase. These particles are uniformly distributed throughout the FeNiCrAlY alloy, the light background area.

Figure 3:
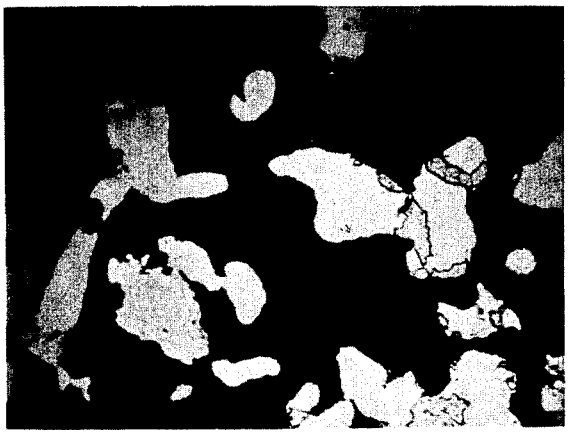
FIG. 3 is a photomicrograph of NiCrAlY fiber taken at 500 magnification.
Figure 4:
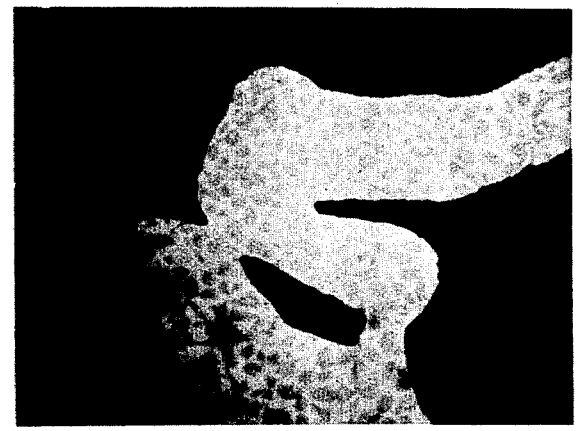
FIG. 4 is a photomicrograph of heat treated FiNiCrAlY fiber taken at 500 magnification.

FeNiCrAlY fibers were compared with fibers made from a class of alloys described in U.S. patent application Ser. No. 444,794, filed Feb. 8, 1974 and incorporated herein by reference. One of the more promising of this class of alloys, an alloy of nickel, chromium, aluminum, and yttrium (NiCrAlY), was formed into fiber. As illustrated in FIG. 3, the NiCrAlY fiber contains a few relatively large aluminum rich particles which appear as enlarged dark zones. The main body of fiber or light zones are deficient in aluminum. Because of the nonuniform aluminum distribution, the body of the NiCrAlY fiber is rapidly depleted of aluminum during oxidation and loses its oxidation resistance. As illustrated in FIG. 4, the FeNiCrAlY fiber has the aluminum rich phase uniformly distributed throughout the fiber. Thus, the surface of this fiber oxidizes uniformly. Because of this feature, the FeNiCrAlY fiber has a longer life than the NiCrAlY fiber under high temperature oxidizing and sulfidizing conditions.

The formation of small aluminum rich particles that are distributed throughout the Type A alloy was quite unexpected. A cobalt base alloy of cobalt, nickel, chromium, aluminum, and yttrium was made and tested to determine if a similar uniform distribution of aluminum rich particles could be obtained. FIG. 5 shows this CoNiCrAlY alloy in the as cast condition. This alloy already includes two phases. The darker areas are the aluminum rich phase. FIG. 6 shows the CoNiCrAlY alloy after heat treatment for 6 hours at 2175° F. Heating this alloy does not result in a uniform distribution of the aluminum rich phase.

Figure 7:
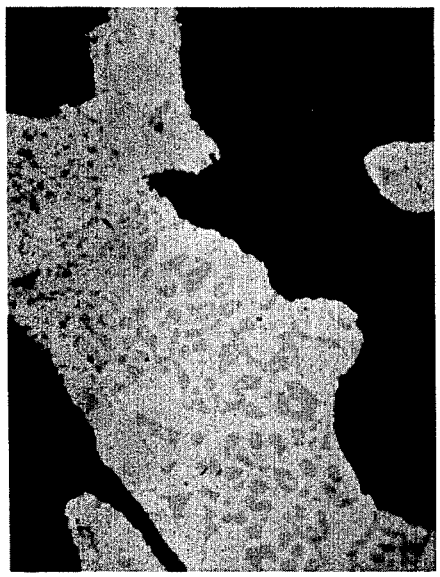
FIG. 7 is a photomicrograph taken at 500 magnification of a heat treated FeNiCrAlY fiber after being exposed to the exhaust from an oil burner.
Figure 8:
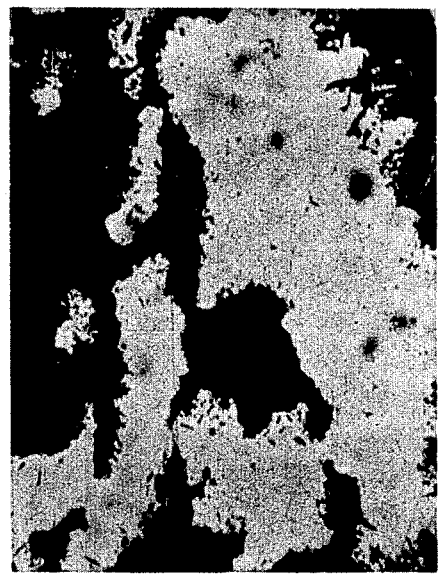
FIG. 8 is a photomicrograph taken at 500 magnification of a NiCrAlY fiber after being exposed to the exhaust from an oil burner.
Figure 9:
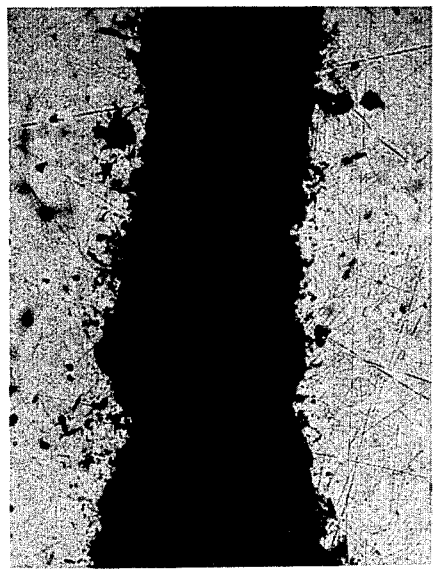
FIG. 9 is a photomicrograph taken at 500 magnification of a fiber (iron base) after being exposed to the exhaust from an oil burner.

To test the improved oxidation and sulfidation resistance of my FeNiCrAlY fiber the Type A fiber, a NiCrAlY fiber, and a fiber made of a commercial alloy were exposed to the exhaust of an oil burner. Samples of these three were simultaneously tested at 1550° F for 98 hours. As shown in FIGS. 7-9, no noticeable scale forms on the Type A fiber, but scale does form on the other fiber.

I claim:

1. An alloy comprising from 2 to 15 weight percent aluminum, from 15 to 35 weight percent nickel, a minimum of 12 weight percent chromium, from 0.0005 to 0.5 weight percent elemental yttrium, and iron in an amount greater than any other metal, the aluminum and chromium having a combined concentration not exceeding 35 weight percent and the nickel and chromium having a combined concentration not exceeding 50 weight percent.

2. An alloy of claim 1 consisting essentially of 22-27 weight percent nickel, 18-22 weight percent chromium, 9-15 weight percent aluminum, 0.0005-0.05 weight percent yttrium, with the balance iron.

3. The alloy of claim 2 including an aluminum rich phase which is uniformly dispersed throughout the alloy.

4. The alloy of claim 3 where the aluminum rich phase is formed by holding the alloy at a temperature ranging between 2100° and 2200° F.

5. A metal fiber of an alloy consisting essentially of 22-27 weight percent nickel, 18-22 weight percent chromium, 9-15 weight percent aluminum, 0.0005-0.05 weight percent elemental yttrium, with the balance iron, said alloy including an aluminum rich phase which is uniformly dispersed throughout the alloy, the fiber having a diameter of less than approximately 35 microns and an aspect ratio greater than 10.

6. The fiber of claim 5 where the aluminum rich phase is formed by holding the alloy at a temperature ranging between 2100° and 2200° F.

7. An abradable seal made from fibers, powders, or composites of fibers and powders, each of said fibers and powders having a composition comprising from 2 to 15 weight percent aluminum, from 15 to 35 weight percent nickel, a minimum of 12 weight percent chromium, from 0.0005 to 0.5 weight percent yttrium and iron in an amount greater than any other metal, the aluminum and chromium having a combined concentration not exceeding 35 weight percent and the nickel and chromium having a combined concentration not exceeding 50 weight percent, the fibers and the powders having a diameter of 35 microns or less.

8. The seal of claim 7 having a density of from 0.1 to 0.5.

9. The seal of claim 7 where the alloy consist essentially of 22-27 weight percent nickel, 18-22 weight percent chromium, 9-15 weight percent aluminum, 0.0005-0.05 weight percent yttrium, with the balance iron.

10. The seal of claim 9 where the alloy includes an aluminum rich phase which is uniformly dispersed throughout the alloy.

11. The seal of claim 10 where the aluminum rich phase is formed by holding the alloy at a temperature ranging between 2100° and 2200° F.

12. The seal of claim 11 made principally of fibers.

* * * * *